(12) United States Patent
Fagnant et al.

(10) Patent No.: US 10,719,792 B2
(45) Date of Patent: Jul. 21, 2020

(54) SYSTEM AND METHOD TO DISTRIBUTE AND EXECUTE RIDESHARE TASKS

(71) Applicant: GM GLOBAL TECHNOLOGY OPERATIONS LLC, Detroit, MI (US)

(72) Inventors: Daniel J. Fagnant, Austin, TX (US); Donal B. McErlean, Ennis (IE); Paul A. Avery, Round Rock, TX (US); Jim McCord, Limerick (IE); Trevor Eckler, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 333 days.

(21) Appl. No.: 15/935,617

(22) Filed: Mar. 26, 2018

(65) Prior Publication Data

US 2019/0295014 A1    Sep. 26, 2019

(51) Int. Cl.
| | |
|---|---|
| *G06Q 10/06* | (2012.01) |
| *H04L 29/06* | (2006.01) |
| *G06Q 10/02* | (2012.01) |
| *G06Q 50/30* | (2012.01) |

(52) U.S. Cl.
CPC ....... *G06Q 10/06311* (2013.01); *G06Q 10/02* (2013.01); *H04L 63/08* (2013.01); *G06Q 50/30* (2013.01)

(58) Field of Classification Search
None
See application file for complete search history.

(56) References Cited

U.S. PATENT DOCUMENTS

| | | | | |
|---|---|---|---|---|
| 2005/0187703 | A1* | 8/2005 | Seligmann | G08G 1/123 701/400 |
| 2012/0265580 | A1* | 10/2012 | Kobayashi | G06Q 30/02 705/7.31 |
| 2015/0228004 | A1* | 8/2015 | Bednarek | G06Q 10/08355 705/26.8 |

(Continued)

OTHER PUBLICATIONS

U.S. Appl. No. 15/611,250, Titled: "A System and Method to Reduce Vehicle Resource Depletion Risk", First Named Inventor: Jeffrey M. Stefan; filed Jun. 1, 2017.

(Continued)

*Primary Examiner* — Susanna M. Diaz
*Assistant Examiner* — Sara Grace Brown

(57) ABSTRACT

A rideshare system including: a memory including executable instructions; a controller to execute the executable instructions; one or more mobile computing devices configured to transmit pickup location data and drop-off location data to the controller; a rideshare vehicle configured to transmit vehicle location data to the controller; and where the executable instructions enable the controller to: receive the pickup location data from the one or more mobile computing devices; receive the drop-off location data from the one or more mobile computing devices; receive vehicle location data from the rideshare vehicle; based on the pickup location data, drop-off location data, and vehicle location data, calculate rideshare service priority variable data for each of the one or more mobile computing devices; transmit, to the rideshare vehicle, the rideshare service priority variable data, pickup location data, and drop-off location data for at least one of the one or more mobile computing devices.

11 Claims, 5 Drawing Sheets

(56) References Cited

U.S. PATENT DOCUMENTS

| | | | |
|---|---|---|---|
| 2017/0011324 A1* | 1/2017 | Truong | G06Q 50/32 |
| 2017/0227371 A1* | 8/2017 | O'Mahony | G08G 1/202 |
| 2018/0025407 A1* | 1/2018 | Zhang | G06Q 30/0635 |
| | | | 705/26.81 |
| 2018/0137593 A1* | 5/2018 | Djuric | G06Q 50/30 |
| 2018/0286003 A1* | 10/2018 | Zhang | G06Q 10/06316 |
| 2018/0341881 A1* | 11/2018 | Kislovskiy | G06Q 50/30 |
| 2019/0005414 A1* | 1/2019 | Haggiag | G06N 20/00 |
| 2019/0101401 A1* | 4/2019 | Balva | G01C 21/343 |
| 2020/0058044 A1* | 2/2020 | Deng | G06Q 10/02 |

OTHER PUBLICATIONS

U.S. Appl. No. 15/611,293, Titled: "A System and Method to Condition Vehicle Availability on Demand", First Named Inventor: Christopher Devries; filed Jun. 1, 2017.

U.S. Appl. No. 15/611,432, Titled: "Vehicle Resource Management System and Method", First Named Inventor: Lyle Wallis; filed Jun. 1, 2017.

U.S. Appl. No. 15/611,163, Titled: "A System and Method for Rideshare Vehicle Chaining", First Named Inventor: Jeffrey Stefan; filed Jun. 1, 2017.

\* cited by examiner

SYSTEM AND METHOD TO DISTRIBUTE AND EXECUTE RIDESHARE TASKS

INTRODUCTION

Fleet management systems employed for personal transportation services can deploy electric vehicles (EVs) made available for reservation. As such, when this rideshare system has delegated and deployed an EV, the vehicle automatically traverses itself over to the customer location for pickup. Thereafter, the vehicle will transport/shuttle the customer to their desired destination and drop the customer off. During periods of particularly high system usage with low vehicle availability, the rideshare system may encounter difficulties in picking customers up. Prioritizing customers on a first-in-first-out basis may require delegated vehicles to traverse unduly long distances to get the next-in-line customer, which can cause unwanted wear and tear on the vehicle as well as frustrate the customer due to undesirable wait times. Accordingly, it is desirable to prioritize rideshare services customers in a way that would not unduly burden the vehicle or customer.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes what is claimed is: a rideshare system including: a memory configured to include one or more executable instructions; a controller configured to execute the executable instructions; one or more mobile computing devices configured to transmit pickup location data and drop-off location data to the controller; a rideshare vehicle configured to transmit vehicle location data to the controller; and where the executable instructions enable the controller to: receive the pickup location data from the one or more mobile computing devices; receive the drop-off location data from the one or more mobile computing devices; receive vehicle location data from the rideshare vehicle; based on the pickup location data, drop-off location data, and vehicle location data, calculate rideshare service priority variable data for each of the one or more mobile computing devices; transmit, to the rideshare vehicle, the rideshare service priority variable data, pickup location data, and drop-off location data for at least one of the one or more mobile computing devices. Other embodiments of this aspect include corresponding computer systems, apparatus, and computer programs recorded on one or more computer storage devices, each configured to perform the actions of the methods.

Implementations may include one or more of the following features. The system may also include the rideshare vehicle is further configured to transmit vehicle resource data to the controller and the executable instructions additionally enable the controller to further base the rideshare service priority variable data on the vehicle resource data. The system may also include the rideshare vehicle is in a fleet of vehicles; the executable instructions further enable the controller to: calculate a number of rideshare vehicles in the fleet of vehicles; calculate the number of mobile computing devices providing pickup location data and drop-off location data; where the rideshare service priority variable data is only calculated when the number of mobile computing devices is greater than the number of rideshare vehicles in the fleet of vehicles. The system where the rideshare service priority variable data is calculated from the following weighted variables: expected revenue earned from serving client ($R_T$), pickup time to serve client ($P_T$), journey time to serve client ($J_T$), charge expended to serve client ($C_T$), current wait time for client ($W_T$), and desirability of client destination ($D_T$). The system where the rideshare service priority variable data is calculated from the following equation:

$$V_T = \alpha(R_T) - \beta 1(P_T) - \beta 2(J_T) - \gamma(C_T) + \delta 1(W_T) + \delta 2(W_T^2) + \varepsilon(D_T).$$

The system where the following weighted factors have the following default values: $\alpha=1.0$; $\beta 1=0.167$; $\beta 2=0.167$; $\gamma=0.20$; $\delta 1=0.167$; and $\delta 2=0.01$ $A=1.0$; $\beta 1=0.167$; $\beta 2=0.167$; $\gamma=0.20$; $\delta 1=0.167$; and $\delta 2=0.0112$. The system may also include the rideshare vehicle is an autonomous vehicle configured to autonomously traverse from one location to another location; and the rideshare vehicle is further configured to: receive, from the controller, the rideshare service priority variable data, pickup location data, and drop-off location data for each of the one or more mobile computing devices; select one of the one or more mobile computing devices based on the rideshare service priority variable data; and traverse to a location corresponding to the pickup location data for the selected mobile computing device. Implementations of the described techniques may include hardware, a method or process, or computer software on a computer-accessible medium.

One general aspect includes providing a memory configured to include one or more executable instructions; providing a controller configured to execute the executable instructions; providing one or more mobile computing devices configured to transmit pickup location data and drop-off location data to the controller; providing a rideshare vehicle configured to transmit vehicle location data to the controller; receiving (at the controller) the pickup location data from the one or more mobile computing devices; receiving (at the controller) the drop-off location data from the one or more mobile computing devices; receiving (at the controller) vehicle location data from the rideshare vehicle; based on the pickup location data, drop-off location data, and vehicle location data, calculating (via the controller) rideshare service priority variable data for each of the one or more mobile computing devices; transmitting (via the controller), to the rideshare vehicle, the rideshare service priority variable data, pickup location data, and drop-off location data for at least one of the one or more mobile computing devices. Other embodiments of this aspect include corresponding computer systems, apparatus, and computer programs recorded on one or more computer storage devices, each configured to perform the actions of the methods.

Implementations may include one or more of the following features. The method may also include the rideshare vehicle is further configured to transmit vehicle resource data to the controller; the rideshare service priority variable data is further based on the vehicle resource data. The method may also include where the rideshare vehicle is in a fleet of vehicles; calculating (at the controller) a number of rideshare vehicles in the fleet of vehicles; calculating (at the controller) the number of mobile computing devices providing pickup location data and drop-off location data; where the rideshare service priority variable data is only calculated when the number of mobile computing devices is greater than the number of rideshare vehicles in the fleet of vehicles. The method where the rideshare service priority variable data is calculated from the following weighted variables: expected revenue earned from serving client ($R_T$), pickup time to serve client ($P_T$), journey time to serve client ($J_T$), charge expended to serve client ($C_T$), current wait time for client ($W_T$), and desirability of client destination ($D_T$). The method where the rideshare service priority variable data is calculated from the following equation:

$$V_T = \alpha(R_T) - \beta1(P_T) - \beta2(J_T) - \gamma(C_T) + \delta1(W_T) + \delta2(W_T^2) + \epsilon(D_T).$$

The method where the following weighted factors have the following default values: $\alpha=1.0$; $\beta1=0.167$; $\beta2=0.167$; $\gamma=0.20$; $\delta1=0.167$; and $\delta2=0.01$ $A=1.0$; $\beta1=0.167$; $\beta2=0.167$; $\gamma=0.20$; $\delta1=0.167$; and $\delta2=0.0112$. The method may also include where the rideshare vehicle is an autonomous vehicle including a vehicle controls device configured to autonomously traverse from one location to another location; receiving (at the vehicle) the transmitted rideshare service priority variable data, pickup location data, and drop-off location data for each of the one or more mobile computing devices; selecting (via the vehicle) one of the one or more mobile computing devices based on the rideshare service priority variable data; and traversing the vehicle (via the vehicle controls device) to a location corresponding to the pickup location data for the selected mobile computing device. Implementations of the described techniques may include hardware, a method or process, or computer software on a computer-accessible medium.

One general aspect includes a non-transitory and machine-readable medium having stored thereon executable instructions adapted to calculate rideshare service priority variable data, which when provided to a controller and executed thereby, causes the controller to: receive pickup location data from one or more mobile computing devices; receive drop-off location data from the one or more mobile computing devices; receive vehicle location data from a rideshare vehicle; based on the pickup location data, drop-off location data, and vehicle location data, calculate rideshare service priority variable data for each of the one or more mobile computing devices; and transmit, to the rideshare vehicle, the rideshare service priority variable data, pickup location data, and drop-off location data for at least one of the one or more mobile computing devices. Other embodiments of this aspect include corresponding computer systems, apparatus, and computer programs recorded on one or more computer storage devices, each configured to perform the actions of the methods.

Implementations may include one or more of the following features. The non-transitory and machine-readable memory further including: receive vehicle resource data from the vehicle; further base the rideshare service priority variable data on the vehicle resource data. The non-transitory and machine-readable memory further including: where the rideshare vehicle is in a fleet of vehicles; calculate a number of rideshare vehicles in the fleet of vehicles; calculate the number of mobile computing devices providing pickup location data and drop-off location data; where the rideshare service priority variable data is only calculated when the number of mobile computing devices is greater than the number of rideshare vehicles in the fleet of vehicle. The non-transitory and machine-readable memory where the rideshare service priority variable data is calculated from the following weighted variables: expected revenue earned from serving client ($R_T$), pickup time to serve client ($P_T$), journey time to serve client ($J_T$), charge expended to serve client ($C_T$), current wait time for client ($W_T$), and desirability of client destination ($D_T$). The non-transitory and machine-readable memory where the rideshare service priority variable data is calculated from the following equation:

$$V_T = \alpha(R_T) - \beta1(P_T) - \beta2(J_T) - \gamma(C_T) + \delta1(W_T) + \delta2(W_T^2) + \epsilon(D_T).$$

The non-transitory and machine-readable memory where the following weighted factors have the following default values: $\alpha=1.0$; $\beta1=0.167$; $\beta2=0.167$; $\gamma=0.20$; $\delta1=0.167$; and $\delta2=0.01$ $A=1.0$; $\beta1=0.167$; $\beta2=0.167$; $\gamma=0.20$; $\delta1=0.167$; and $\delta2=0.0112$.

The non-transitory and machine-readable memory where the vehicle is an autonomous vehicle configured to autonomously traverse from one location to another location; and the rideshare vehicle is further configured to: receive, from the controller, the rideshare service priority variable data, pickup location data, and drop-off location data for each of the one or more mobile computing devices; select one of the one or more mobile computing devices based on the rideshare service priority variable data; and traverse to a location corresponding to the pickup location data for the selected mobile computing device. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
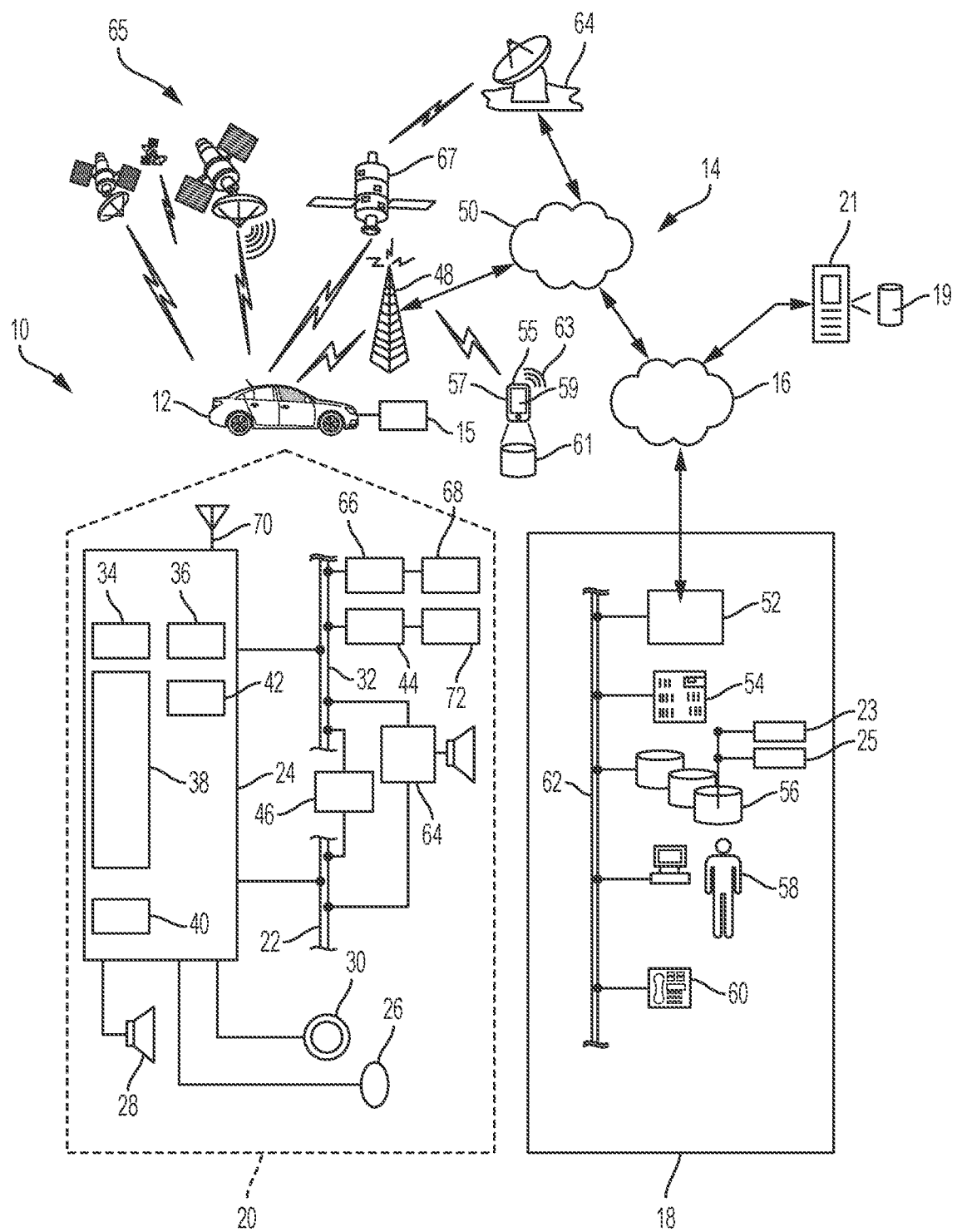
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the system disclosed herein and/or to implement examples of the methods disclosed herein. Communication system 10 generally includes one or more vehicles 12 (shown as one), a wireless carrier system 14, a land network 16, a data center 18 (i.e., the backend), and a module server 21. It should be appreciated that the overall architecture, setup and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Vehicle 12 may be any type of user operated or autonomous vehicle (discussed below) such as a motorcycle, car, truck, bicycle, recreational vehicle (RV), boat, plane, etc., and is equipped with suitable hardware and software that enables it to communicate over communication system 10. Vehicle 12 may include a power train system with multiple generally known torque-generating devices including, for example, an engine 15. In certain embodiments, engine 15 can be an internal combustion engine that uses one or more cylinders to combust fuel, such as gasoline, in order to propel vehicle 12. In one or more alternative embodiments, however, the power train system can include numerous electric motors or traction motors that convert electrical energy into mechanical energy for propulsion of vehicle 12 (discussed below). Skilled artists will also see engine 15 can be a compression-ignition engine which uses a combustion chamber to combust fuel, such as diesel fuel, compressed natural gas, or propane.

Some of the fundamental vehicle hardware 20 for each fleet vehicle is shown generally in FIG. 1 including a telematics unit 24, a microphone 26, speaker 28, and buttons and/or controls 30 connected to telematics unit 24. Operatively coupled to telematics unit 24 is a network connection or vehicle bus 32. Examples of suitable network connections include a controller area network (CAN), a media oriented system transfer (MOST), a local interconnection network (LIN), an Ethernet, dedicated short-range communications channel (DSRC), and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communications with the data center 18, and generally includes an electronic processing device 38, one or more types of electronic memory 40, a cellular chipset/component 34, wireless modem 36, dual mode antenna 70, and navigation unit containing a GPS chipset/component 42 capable of communicating vehicle location information via a GPS satellite system 65. GPS component 42 thus receives coordinate signals from a constellation of GPS satellites 65. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS component 42), or some or all navigation services can be done via telematics unit 24, wherein the location coordinate information (vehicle location data) is sent to a remote location for purposes of providing the vehicle with navigation maps, map annotations, route calculations, and the like.

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware 20 also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services. The vehicle hardware even further includes one or more interior cameras 31 used to scan the vehicle interior and detect objects.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout each fleet vehicle and use the sensed input to perform diagnostic, monitoring, control, reporting and/or other functions. Each of the VSMs 44 is preferably connected by vehicle bus 32 to other VSMs 44, as well as to telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) feature that provides myriad real-time system function data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. Another VSM 44 can be a body control module (BCM) that monitors and governs various electrical components located throughout the vehicle body like the vehicle's power door locks, air conditioner, tire pressure, lighting system, engine ignition, vehicle seat adjustment and heating, mirrors, and headlights. Furthermore, as can be appreciated by skilled artisans, the above-mentioned VSMs are only examples of some of the modules that may be used the vehicles 12, as numerous others are also possible.

A passive entry passive start (PEPS) module 44, for instance, can be another of the numerous of VSMs and provides passive detection of the absence or presence of a passive physical key or a virtual vehicle key. When the passive physical key approaches, the PEPS module 44 can determine if the passive physical key is authentic as belonging to the vehicle. The PEPS 44 can likewise use authentication information received from data center 18 to determine if a mobile computing device 57 with virtual vehicle key is authorized/authentic to vehicle. When the virtual vehicle key is deemed authentic, the PEPS module can send a command to BCM 44 permitting access to its vehicle. It should be understood that the PEPS may be an electronic hardware component connected to the vehicle bus 32 or, in an alternative embodiment, may be one or more software code segments uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with remote locations (e.g., data center 18), digital camera 55, user interface 59, mobile memory 61 to store one or more databases, and/or GPS module 63 capable of receiving GPS satellite signals and generating GPS coordinates based on those signals. User interface 59 may be embodied as a touch-screen graphical interface capable of user interaction as well as exhibiting information. Digital camera 55 may include the ability to generate bitmapped data representations of captured tangible-object images through generally known operations. Examples of the mobile computing device 57 include the iPhone™ and Apple Watch™ each being manufactured by Apple, Inc. and the Droid™ smart phone manufactured by Motorola, Inc. as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 24 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate how virtual key fob pairing can occur—upon receiving a request, data center 18 will generate an encrypted virtual vehicle key to permit vehicle access via mobile computing device 57. Data center 18 will then transmit aspects of this encrypted virtual vehicle key information to both mobile computing device 57 and the PEPS module 44 via telematics unit 24. After pairing has been established, mobile computing device 57 will send its virtual vehicle key aspect to telematics unit 24 for recognition in light of its stored corresponding virtual key aspect and in turn the PEPS may establish mobile computing device 57 as the acting key fob for the vehicle. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58 as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 56, telematics unit 24, and mobile computing device 57. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Database 56 could be designed to store information in the form of executable instructions such as, but not limited to, numerous application program interface (API) suites accessed, executed, and/or governed by server 54. Moreover, in certain instances, these API suites may be accessible to the system user (client), data center 18, or one or more third parties. As examples, one API suite can be a rideshare services suite 23 that incorporates numerous exemplary rideshare system records (i.e., reservation request details information such as, for example, client pickup location and client drop-off location information) each having information related to the vehicle 12 such as, but not limited to, rideshare vehicle records (e.g., vehicle VSM information, vehicle resource information), information related to the user such as, but not limited to, reservation account records (e.g., vehicle comfort settings information, telematics unit settings, or vehicle make-model preferences), and information related to fleet management (e.g., fleet vehicle feedback data, active vehicle data, localization and mapping data, path planning feedback data, etc.), or any other pertinent rideshare system information. The records can moreover be copied, organized, and/or stored in a tabular form that allows for continuous, real-time updates. The records can additionally collaborate with a reservation account (discussed below) for support of, for example, reservation management.

Another example of an API suite is a route priority suite 25 that is configured to provide a geosurface map generated through known mapping engine and search engine software modules and processes. Priority Module moreover provides a linear-weighted Rideshare Service Priority number defined by the calculated value of serving a rideshare system client for one or more rideshare tasks. The geosurface map contains a multitude of known routes and distance information corresponding thereto as well as identifiable static and dynamic resources. In furtherance, priority module can use this map information in conjunction with information from one or more records (retrieved from the rideshare services suite 23), for example, client pickup and drop off location data (corresponding to the mobile computing device 57 of the client), vehicle location data (corresponding to the real-time location of each fleet vehicle), and vehicle resource information (e.g., the real-time remaining charge of the vehicle battery), to calculate specific Rideshare Service Priority data for each rideshare system client. The route priority module 25 can then consolidate and send the Rideshare Service Priority data to recently available or soon-to-be available fleet vehicles 12. The fleet vehicles can then review and analyze the Rideshare Service Priority numbers that may be included in the data for the purpose of selecting a location corresponding to the mobile computing device 57 (or some other selected pickup location) of one of the system clients and then traverse to that client to complete a rideshare task. The route priority module 25 may alternatively select a pickup location of one of the system clients on behalf of fleet vehicle 12 and send that client selection over as part of Rideshare Service Priority data.

In one or more embodiments, server 54 may only access and execute the route priority suite 25 when system demand exceeds a certain threshold. Server 54 will otherwise implement one or more known processes to instruct fleet vehicles to complete the rideshare tasks (i.e., first-in-first-out queueing methodologies). For example, when determining whether to implement route priority module 25, server 54 may calculate both the number of fleet vehicles (i.e., via rideshare services suite 23) and system clients (i.e., via mobile computing device information) in a certain geographic area. Server 54 may then determine whether the number of system clients exceeds the number of fleet vehicles and implement rideshare services suite 23 only when there are more system clients than fleet vehicles.

The user of mobile computing device 57 may create their own personalized vehicle reservation account to be stored in mobile memory 61 and which may have access to one or more corresponding rideshare records at the backend. The user may perform tasks to create this account through a variety of frontend devices such as, for example, through a remote computer and mobile computing device 57. This reservation account may be uploaded to or accessible on server 54 (i.e., to support backend functions). Data center 18 may also access one or more additional remote servers 21 and/or remote databases (e.g., Department of Motor Vehicles, traffic databases, etc.) to receive information in support of establishing the reservation account as well as a particular reservation and one or more rideshare system records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account as a software module therefrom. The reservation account may moreover include one or more prompts to instruct the user to provide information (e.g., validating data) to support account creation.

Reservation account may also provide one or more prompts to assist a rideshare system client in reserving a personal transportation vehicle by operatively accessing and communicating with the rideshare-oriented API suites (for the purposes of obtaining transportation to certain destinations, for example, from user specified pickup coordinates to user specified drop-off coordinates). Once a reservation (i.e., a rideshare task request) has been made, mobile computing device 57 will transmit this reservation information to one or more of the rideshare records for updates thereto. At the backend, server 54 will collaborate with database 56 and one or more of the API suites (e.g., route priority suite 25) to help a subset of the vehicle fleet select and carryout the requested rideshare task.

To illustrate, for example, in one or more embodiments, server 54 can manage the use of a fleet of twenty (20) vehicles in a particular geographic location and determine that one (1) of those vehicles has just been made available to carry out requested rideshare tasks or will soon be made available to carry out such task requests. Server 54 will then, for example, send that fleet vehicle a consolidated list of calculated Rideshare Service Priority numbers as at least part of Rideshare Service Priority data. The fleet vehicle will then assign each Rideshare Service Priority number to a corresponding reservation requests (i.e., to the mobile computing device location or client requested pickup location). Fleet vehicle will then select one of the rideshare task requests based on the associated calculated Rideshare Service Priority numbers. For example, fleet vehicle 12 will choose the best waiting client that has the highest considered value. Once the client is selected, the fleet vehicle 12 will let server 54 know so that it can assign the correct vehicle identifier to the reservation account and corresponding rideshare records for use during the requested reservation. Server 54 then communicates provided pickup coordinates (pickup location data) and drop-off coordinates (drop-off location data), to the selected fleet vehicle via its telematics unit 24 so the vehicle can direct itself to the user, pick the user up at a designated location, and then drop the user off at a designated location. Server 54 may alternatively select one of the rideshare task requests based on the associated Rideshare Service Priority numbers and send that client selection to fleet vehicle 12 (which may be the Rideshare Service Priority numbers and drop off location data) as at least part of Rideshare Service Priority data, as well as automatically assign the correct vehicle identifier to the reservation account and corresponding rideshare records. As vehicles are requested and used, server 54 can determine the identities of the vehicles currently in use and monitor various aspects of the other fleet vehicles so as to understand which vehicles are available or will be made available at any particular time. This monitoring process may thus be conducted through review of one or more rideshare records.

Remote database server 21 can be one of a number of computers accessible via a private or public network such as the Internet. Each such computer 21 can be used for one or more purposes, such as storing one or more dynamic content providers which can provide dynamic content for map data. Other such accessible computers 21 can be, for example a third-party repository to or from which vehicle data or other information is provided, whether by communicating with the vehicle 12 or data center 18, or both.

Electric Vehicle Aspects

Figure 2:
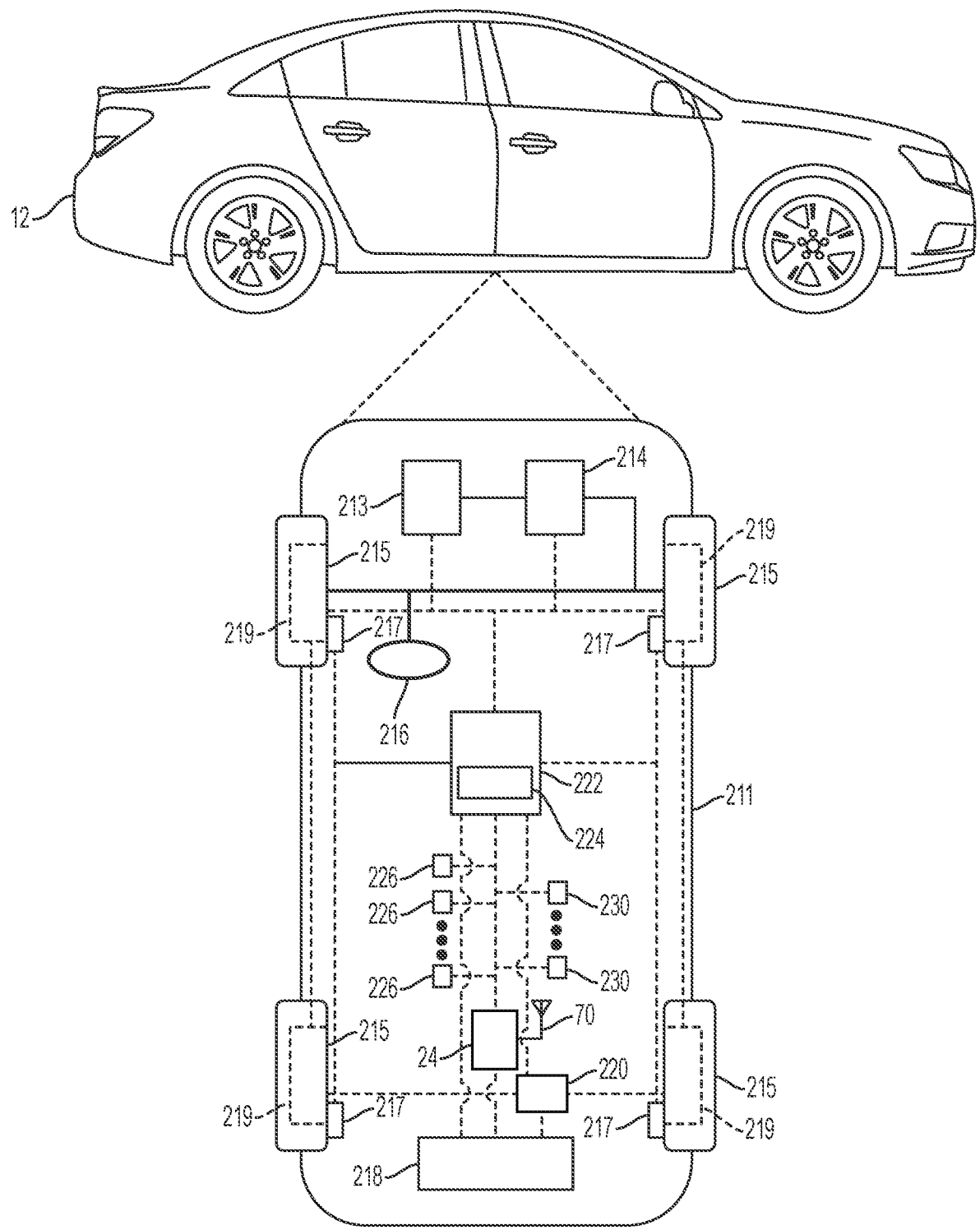
FIG. 2 is a schematic diagram of an autonomously controlled electric vehicle, according to an embodiment of the communications system of FIG. 1.

With reference to FIG. 2, in one or more embodiments, vehicle 12 can be an electric vehicle (EV) that generally includes vehicle wheels 215 which rotatably support a vehicle body 211. Vehicle 12 can further include a propulsion system 213 with at least one electric motor 219. An electric motor 219 is operatively connected to each of the vehicle wheels 215 to transmit torque thereto, and thereby propels the vehicle 12. These motors may moreover, in one or more embodiments, be directly or indirectly connected to their corresponding wheel via a transmission 214 (shown as a direct connection configuration). It should be understood that vehicle 12 may also be embodied as an extended range electric vehicle (EREV) or hybrid vehicle (combining an internal combustion engine with one or more electric motors).

Propulsion system 213 can also include a power source 218 embodied as a battery for the purpose of providing direct-current (DC) electricity to power each of the motors, as well as other vehicle systems. Each motor may be a permanent-magnet motor, induction motor, or any type of motor that uses alternating current (AC) electricity. Consequently, propulsion system 213 can include an inverter aspect 220 operatively connected to the power source output so as to allow the DC current to be converted into AC current before being supplied to the motors. Propulsion system 213 may additionally be connected to a vehicle controls device 222, discussed below, to regulate the amount of transmitted energy from power source 218 so as to effectively control the torque output from each motor 219. Propulsion system 213 may further include an input component, which in some embodiments can be operable by a human (i.e., a selectively depressible foot pedal), to provide for an input of a desired torque output. Propulsion system 213 may moreover be connected to vehicle bus 32 to communicate with one or more VSMs 44 (not shown). For example, OBD 44 may provide State of Charge (SoC) information for power source 218 based on information received from one or more power reading sensors.

While depicted as a single unit for illustrative purposes, vehicle controls device 222 may additionally include one or more other controllers, collectively referred to as a "controls device" or "vehicle controls device." Controls device 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controls device 222 in controlling the vehicle.

Autonomous Vehicle Aspects

In addition to the vehicle aspects discussed above, in one or more embodiments, vehicle 12 can be an autonomous vehicle. In those embodiments in which vehicle 12 is an autonomous vehicle, a transmission 214 may be installed to transmit power from propulsion system 213 to vehicle wheels 215 according to selectable speed ratios. According to various embodiments, transmission 214 may include a step-ratio automatic transmission, a continuously-variable transmission, or other appropriate transmission. Vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. It should be understood transmission 214 does not necessarily need to be installed for propulsion system 213 to propel vehicle 12.

Vehicle 12 additionally includes a steering system 216. While depicted as including a steering wheel for illustrative purposes, in some contemplated embodiments, the steering system 216 may not include a steering wheel. Telematics unit 24 is additionally configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, this communication system communicates via at least one dedicated short-range communications (DSRC) channel. DSRC channels refer to one-way or two-way short-range to medium-range wireless communication channels specifically designed for automotive use and a corresponding set of protocols and standards.

The propulsion system 213 (explained above), transmission 214, steering system 216, and wheel brakes 217 are in communication with or under controls device 222. Vehicle controls device 222 includes an automated driving system (ADS) 224 for automatically controlling various actuators in the vehicle. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, motors 219, steering system 216, and wheel brakes 217 to control vehicle acceleration, steering, and braking, respectively, without human intervention via a plurality of actuators 230 in response to inputs from a plurality of driving sensors 226, which may include GPS, RADAR, LIDAR, optical cameras, thermal cameras, ultrasonic sensors, and/or additional sensors as appropriate.

Figure 3:
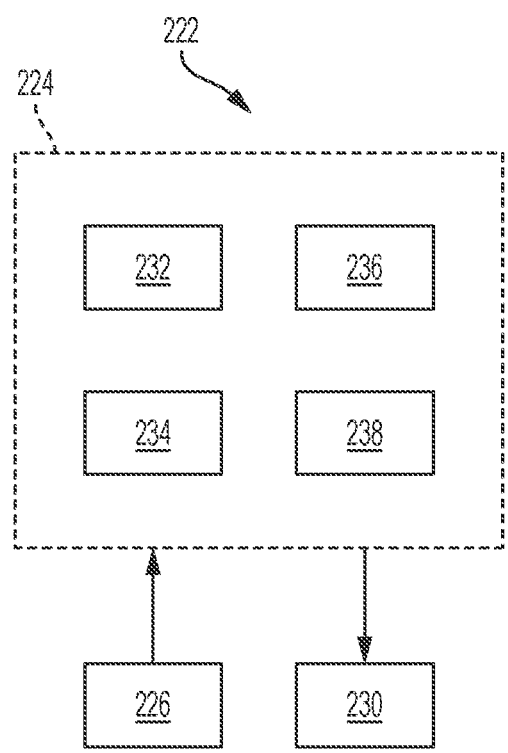
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, lidars, radars, and/or any number of other types of sensors. In one or more exemplary embodiments described herein, the sensor fusion system 232 supports or otherwise performs the ground reference determination processes and correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 232 provided to the vehicle control system 238 (e.g., indicia of detected objects and/or their locations relative to the vehicle 12) reflects or is otherwise influenced by the calibrations and associations between camera images, lidar point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the vehicle controls device 222 implements machine learning techniques to assist the functionality of the vehicle controls device 222, such as feature detection/classification, obstruction mitigation, route traversal, mapping, sensor integration, ground-truth determination, and the like.

The output of vehicle controls device 222 is communicated to actuators 230. In an exemplary embodiment, the actuators 230 include a steering control, a shifter control, a throttle control, and a brake control. The steering control may, for example, control a steering system 216 as illustrated in FIG. 2. The shifter control may, for example, control a transmission 214 as illustrated in FIG. 2. The throttle control may, for example, control a propulsion system 213 as illustrated in FIG. 2. The brake control may, for example, control wheel brakes 217 as illustrated in FIG. 2.

System

As explained above, at least in part, rideshare systems are those systems which allow a user (i.e., a rideshare system client) to download a reservation to mobile computing device 57 and then register their own individualized account by providing personal and/or payment information. The client may then have access to a rideshare system to request personal transportation from an available fleet vehicle, usually one within a certain geographic or temporal proximity of their location or a selected pickup location (e.g., ≤5-10 miles, or ≤10-20 minutes travel time). Once the rideshare reservation is placed, an associated fleet vehicle will autonomously traverse to the user's location, pick the user up, autonomously transport/shuttle the user to their selected destination and drop the user off. Afterwards, the user may be provided an opportunity to submit their own feedback/rating of one or more of the rideshare system services. Thus, an exemplary rideshare system task should be considered one in which the delegated fleet vehicle retrieves a client at the pickup location and then autonomously transports/shuttles that client from their pickup location to a subsequent selected destination (i.e., a drop-off location).

In one or more embodiments, the rideshare system (discussed above) will adjust its task request prioritization methodologies in light of consumer demand. For example, during periods of particularly high system usage with low vehicle availability, the rideshare system may implement route priority suite 25 to enable the available or soon-to-be available rideshare vehicles to take on requested rideshare tasks based on their estimated value (i.e., via their Rideshare Service Priority number) so as to help ensure system clients aren't made to wait an undesired amount of time and cancel their reservations.

In one or more embodiments, route priority suite 25 can use a linear weighted approach to come up with the Rideshare Service Priority number associated with each system client (i.e., each requested rideshare task). For example, route priority suite 25 may retrieve a client's requested pickup location data and drop-off location data as well as vehicle location data and vehicle resource data from rideshare services suite 23 and plug the information into a linear weighted equation with multiple competing factors to come up with the value associated with a requested rideshare task (e.g., in constant dollars), which allows the fleet vehicle to determine the best suited clients. The linear weighted equation can be represented as:

$$V_T = \alpha(R_T) - \beta1(P_T) - \beta2(J_T) - \gamma(C_T) + \delta1(W_T) + \delta2(W_T^2) + \varepsilon(D_T) \quad \text{(equation 1)}$$

where $V_T$ represents the Rideshare Service Priority number (otherwise, "Rideshare Service Priority variable") as defined by the weighted variables $R_T$, $P_T$, $J_T$, $C_T$, $W_T$, and $D_T$. Moreover, where $R_T$ is weighted by factor "$\alpha$" and represents the Expected Revenue Earned from Serving a Client, $P_T$ is weighted by factor "$\beta1$" and represents Pickup Time to Serve a Client, $J_T$ is weighted by factor "$\beta2$" and represents the Journey time to Serve a Client, $C_T$ is weighted by factor "$\gamma$" and represents the Charge Expended to Serve a Client, $W_T$ is weighted by factor "$\delta1$" or "$\delta2$", respectively, and represents the Current Wait Time for Client, and $D_T$ is weighted by factor "$\varepsilon$" and represents the Desirability of the Client's Destination. It should be understood the weighted factors can be optimized through simulation using a genetic algorithm or the like (e.g., when the objective function seeks to maximize revenue) and further refined once experiential data is collected from serving paying customers. It should also be understood that this is one weighted sum formulation and that other possible alternative combinations may be used to derive the Rideshare Service Priority number associated with each system client.

More specifically, the Expected Revenue Earned from Serving a Client ($R_T$) is calculated based on constant dollars and has an exemplary default weight value of 1.0 (i.e., $\alpha=1.0$). In addition, route priority suite 25 can calculate $R_T$ as the distance of the requested rideshare task multiplied by the fare per mile assigned to the requested rideshare task. For example, if it is determined (i.e., via the geosurface map) that the distance between the pickup location and drop-off location of the requested rideshare task is six (6) miles and the fare per mile is set at $2.50 per mile, the calculated Expected Revenue Earned from Serving a Client will be $15.00. Skilled artisans will see that the Expected Revenue Earned from Serving a Client will be directly affected by surge pricing being instated at certain times throughout a typical day.

The Pickup Time to Serve a Client ($P_T$) is calculated based on time and has an exemplary default weight value of 0.167 (i.e., $\beta1=0.167$). In addition, route priority suite 25 can calculate $P_T$ as the journey time the fleet vehicle must take before arriving at the requested pickup location for the client. As skilled artists will see, this is otherwise considered as the deadheading travel time. Thus, the larger the $P_T$, the longer the client must wait before the fleet vehicle arrives to carry out the requested rideshare task. It should be understood that the cost component of journey time represents the cost to the vehicle in terms of wear-and-tear on the fleet vehicle and opportunity cost (i.e., time the vehicle could be doing something else).

Similar to the $P_T$, the Journey time to Serve a Client ($J_T$) is also calculated based on time and also has an exemplary default weight value of 0.167 (i.e., $\beta2=0.167$). In addition, route priority suite 25 can calculate $J_T$ as the total travel time it will take to complete the requested rideshare task. Namely, $J_T$ takes into consideration the journey time for a fleet vehicle to arrive at the requested pickup location for the client coupled with the journey time needed to complete the requested rideshare task (i.e., the journey time expected for ferrying the client to the drop-off location).

The Charge Expended to Serve a Client ($C_T$) is calculated based on constant dollars and has an exemplary default weight value of 0.2 (i.e., $\gamma=0.2$). In addition, route priority suite 25 can calculate $C_T$ as the amount of charge that will be depleted from power source 218 to carryout the requested rideshare task. For example, the State of Charge of power source 218 may be reduced by 13% for the corresponding fleet vehicle to traverse from its location through to the end of the requested rideshare task. $C_T$ would be considered the cost of replenishing the State of Charge back to where it was before attending to the requested rideshare task (i.e., the cost to recharge power source 218 by 13% at typical charge station prices).

Current Wait Time for a Client ($W_T$) is calculated based on time and has an exemplary default weight value of 0.167 (i.e., $\delta1=0.167$). In addition, route priority suite 25 can calculate $W_T$ as the estimated amount of time the client will be waiting for the fleet vehicle to arrive at the requested pickup location. Thus, the cost component of this client wait time represents the perceived burden on the client when waiting for a requested rideshare task to begin. Skilled artists will see that, while wait time is not a direct cost incurred by the rideshare service provider, increasing wait time will enhance the probability that a customer will abandon the pickup request (and may make the customer less likely to use the service in the future).

Research indicates that clients value travel time and the standard deviation of travel time variation approximately equally. For instance, when comparing a first rideshare task having a 20-minute expected rideshare task length with a +/−2 minute expected deviation to a second rideshare task having a 15-minute expected rideshare task length with a +/−10 minutes expected deviation, clients generally prefer the first trip to the second. Similarly, clients also generally dislike volatility when waiting for rideshare vehicles to pick them up for a rideshare task. As such, research dictates that clients typically prefer to consistently wait two minutes when requesting a rideshare task over waiting one minute for 49 out of 50 rideshare tasks requested and then being forced to wait an additional 30 minutes for the 50$^{th}$ rideshare task request. As follows, to avoid unpredictable and excessively long wait times, equation 1 incorporates an additional calculation for $W_T$. This additional calculation squares the value of $W_T$ and has an exemplary default weight value of 0.0112 (i.e., δ2=0.0112).

Figure 4:
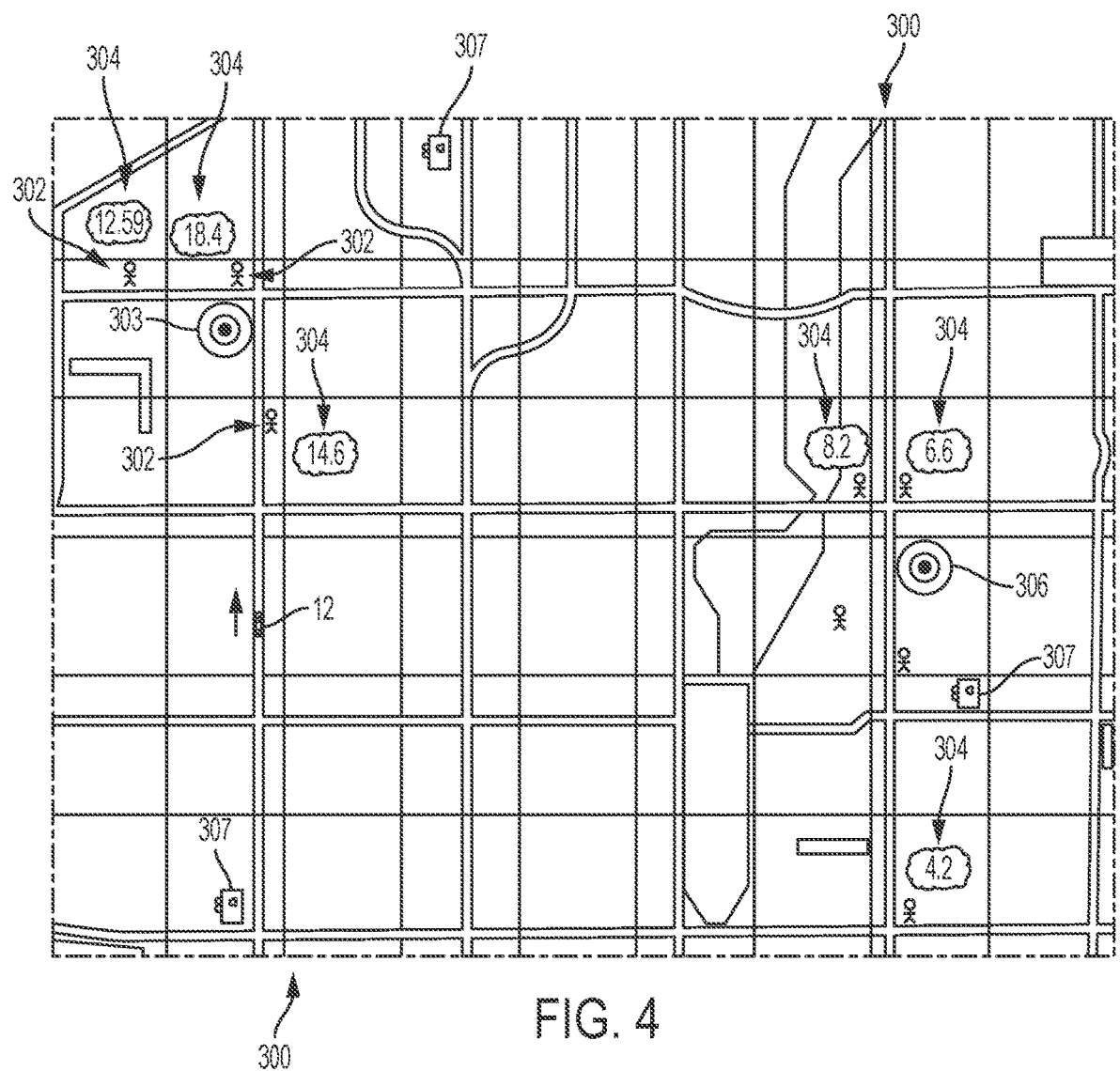
FIG. 4 represents broad aspects of an exemplary map illustrating a performance of an exemplary route priority suite.

Desirability of the Client's Destination ($D_T$) is calculated based on either distance or imbalance between available vehicle supply and expected traveler demand, and has an exemplary default weight value of 0.1 (i.e., ε=0.1). In addition, in one embodiment, route priority suite 25 can calculate $D_T$ as the distance to the nearest charging station (shown as reference number 307 in FIG. 4) upon the completion of the rideshare task multiplied by the remaining charge for power source 218. For example, if the distance between the requested drop off location and nearest electric vehicle (EV) charging station is 2 miles and the remaining battery charge is 20%, the $D_T$ can be 0.4. In essence, this embodiment of the $D_T$ value would represent the desirability of returning to a charging station after completing the ride (vs. conducting a different action), as well as the time and further charge expenditure it would take to get to the station. As can be understood, moreover, this embodiment of $D_T$ may be calculated when the power source 218 of the available/soon-to-be available fleet vehicle is low on charge.

In another embodiment, $D_T$ may be based on the imbalance of waiting clients/expected clients in a selected geographic area in comparison to the number of fleet vehicles servicing the selected geographic area (i.e., the relative share of expected travel demand vs. supply of available/soon-to-be available fleet vehicles). For example, if there is a two (2) mile by two (2) mile selected geographic area in the servicing region ("Area A") which has 30% of the available fleet vehicles but just 5% of the expected regional demand and there is another two (2) mile by two (2) mile selected geographic area in the servicing region ("Area B") which has no available fleet vehicles but 15% of regional demand, a requested rideshare task that has a drop-off destination in Area B should be provided a higher $D_T$ value than a requested rideshare task for one that has a drop-off destination in Area A.

As explained above a Rideshare Service Priority number associated with each system client (i.e., each requested rideshare task) can be pushed to the available or soon-to-be available fleet vehicle 12 considered to be next in line to take on requested rideshare tasks. The pickup location data for each client may also be pushed to fleet vehicle 12. As follows and represented by FIG. 4, upon receiving the pushed information, fleet vehicle 12 can determine the expected location of each client based on their corresponding client pickup location data 303 (i.e., via telematics unit 24). Fleet vehicle can then associate each client 302 with their corresponding calculated Rideshare Service Priority 304. As shown, the value of serving a rideshare system client can vary drastically. For example, one client may be associated with a Rideshare Service Priority value of 18.4 (upper left quadrant—and may be considered to represent a monetary value of $18.40) whereas another client may be associated with a Rideshare Service Priority value of 4.2 (lower right quadrant—and may be considered to represent a monetary value of $4.20).

Fleet vehicle 12 may then make a selection of the client with the greatest associated Rideshare Service Priority value. Upon making a client selection, rideshare vehicle 12 may then communicate with server 54 to verify a selection has been made and server 54 may push the drop-off location 306 for the client (or the drop-off location may be pushed simultaneously with the pickup location data or both may be pushed with the calculated Rideshare Service Priority number). Fleet vehicle 12 may then traverse to the desired client pickup location 303 to carryout the rideshare task by traversing to the drop off location 306 (e.g., via vehicle controls device 222), which may be automatically or upon instruction from server 54.

Alternatively, in one or more embodiments, route priority suite 25 (i.e., server 54) may also analyze the Rideshare Service Priority numbers to independently select the client with the greatest associated Rideshare Service Priority value on behalf of fleet vehicle 12. As should be understood, this client selection type of Rideshare Service Priority variable data will be pushed to fleet vehicle 12 and may be along with the pickup location data and drop-off location data (which may all be pushed simultaneously, or in a sequence similar to the one discussed above). In one or more embodiments, fleet vehicle 12 may also check this pushed client selection from data center 18 against the pushed Rideshare Service Priority number and/or pickup location data for each client so as to ensure that the backend selection is the correct choice under the current circumstances (e.g., when the fleet vehicle 12 has significantly changed positions between when the backend selection was made and when it was received). It should also be understood that both the Rideshare Service Priority number that can be pushed to fleet vehicle 12 as well as the client selection derived from the Rideshare Service Priority number which can alternatively or in conjunction be pushed to fleet vehicle 12 each fall under the definition of the "Rideshare Service Priority variable data" for purposes of the broad scope of the claims. Moreover, skilled artists will see that other data related to and derived from the Rideshare Service Priority number may also be considered to fall within the definition of "Rideshare Service Priority variable data."

Method

Figure 5:
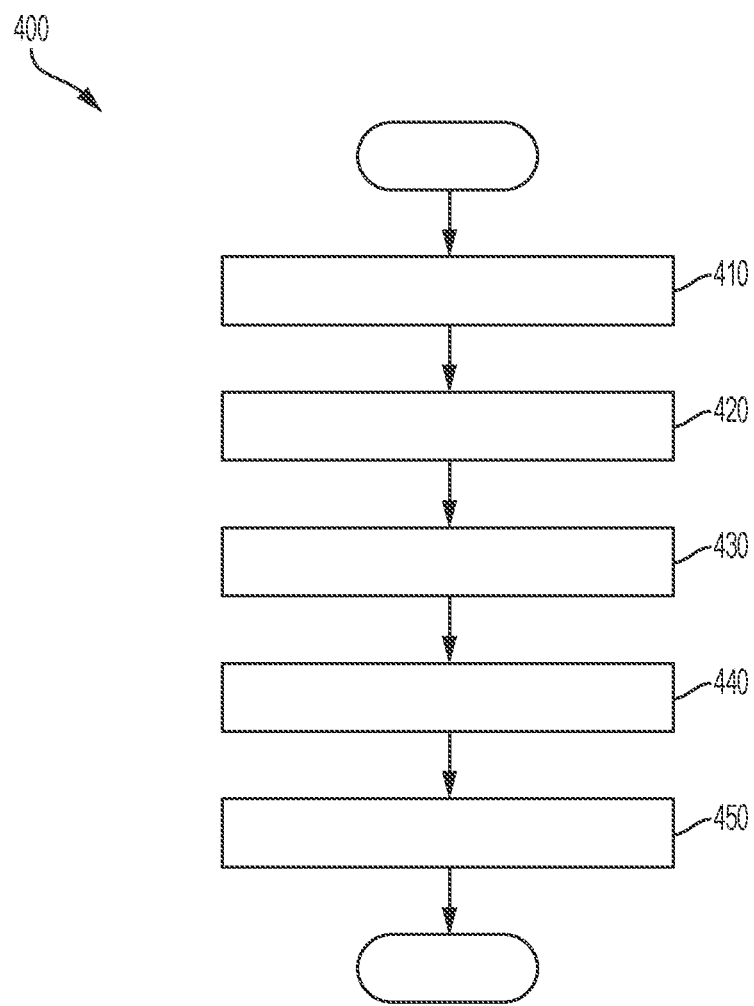
FIG. 5 is a flow chart for an exemplary methodology for providing Rideshare Service Priority data in accordance with an exemplary aspect.

Now turning to FIG. 5, there is shown an embodiment of a method 400 to provide a calculated Rideshare Service Priority value to a fleet vehicle. One or more aspects of the Rideshare Service Priority calculation method 400 may be completed through the rideshare services suite 23 being implemented by server 54 of data center 18 which may include one or more executable instructions incorporated into database 56. One or more aspects of method 400 may, for example, be completed through the route priority suite 25 being implemented by server 54 of data center 18. One or more aspects of method 400 may otherwise, for example, be completed through vehicle telematics unit 24, mobile computing device 57, and vehicle controls device 222. Skilled artisans will moreover see that telematics unit 24, data center 20, and mobile computing device 57 may be remotely located from each other.

Method 400 is supported by telematics unit 24 being configured communicate with data center 18. This configuration may be made by a vehicle manufacturer at or around the time of the telematics unit's assembly or after-market (e.g., via vehicle download using the afore-described communication system 10 or at a time of vehicle service, just to name a couple of examples). In at least one implementation, one or more instructions are provided to the telematics unit 24 and stored on non-transitory computer-readable medium (e.g., on memory device 40). Method 400 is further supported by preconfiguring data center 20 to store the rideshare services suite 23, route priority suite 25, as well as one or more other APIs in database 84, each of which being accessible via server 82. Method 400 is further yet supported by preconfiguring mobile computing device 57 to activate and implement the reservation account.

Method 400 begins with step 410 in which server 54 receives the pickup location data from a mobile computing device 57 associated with one of the rideshare system users (clients), as discussed above. In step 420, server 54 receives the drop-off location data from mobile computing device 57 (discussed above). It should be understood steps 410 and 420 may be simultaneous or sequential. In step 430, server 54 receives the vehicle location data and charge data of power source 218 from the available or soon-to-be available vehicle 12 (discussed above). In step 440, based on the received data from both mobile computing device 57 and the fleet vehicle 12, priority suite 25 will calculate the Rideshare Service Priority value for each client, as discussed above. In step 450, rideshare priority suite 25/server 54 will push Rideshare Service Priority data and, subsequently or simultaneously, the pickup and drop-off data for each client (i.e., each mobile computing device) over to the available or soon-to-be available fleet vehicle 12. This data will allow fleet vehicle 12 to select a client based on their associated Rideshare Service Priority value and in turn autonomously traverse to that client to carry out the client's requested rideshare task. Alternatively, the Rideshare Service Priority data is a client selection made by priority suite 25. This type of Rideshare Service Priority data causes the fleet vehicle 12 to autonomously traverse to the client selected by priority suite 25 so as to carry out the client's requested rideshare task. Upon completion of step 450, method 400 will move to completion.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A rideshare system comprising:
   a memory configured to comprise one or more executable instructions;
   a controller configured to execute the executable instructions;
   one or more mobile computing devices configured to transmit pickup location data and drop-off location data to the controller;
   a rideshare vehicle configured to transmit vehicle location data to the controller, wherein the rideshare vehicle is an autonomous vehicle configured to autonomously traverse from one location to another location; and
   wherein the executable instructions enable the controller to:
   receive the pickup location data from the one or more mobile computing devices;
   receive the drop-off location data from the one or more mobile computing devices;
   receive vehicle location data from the rideshare vehicle;
   based on the pickup location data, drop-off location data, and vehicle location data, calculate a Rideshare Service Priority number for each of the one or more mobile computing devices, wherein the Rideshare Service Priority number is calculated via the following equation:

$$V_T = \alpha(R_T) - \beta1(P_T) - \beta2(J_T) - \gamma(C_T) + \delta1(W_T) + \delta2(W_T^2) + \varepsilon(D_T)$$

wherein $V_T$ is the Rideshare Service Priority number, $R_T$ is an Expected Revenue Earned from Serving Client, $P_T$ is a Pickup Time to Serve Client, $J_T$ is a Journey Time to Serve Client, $C_T$ is a Charge Expended to Serve Client, $W_T$ is a Current Wait Time for Client, $D_T$ is a Desirability of Client Destination, and wherein each of $\alpha$, $\beta1$, $\beta2$, $\gamma$, $\delta1$, $\delta2$, and $\varepsilon$ is a weighted variable with a numerical default value;
   transmit, to the rideshare vehicle, the Rideshare Service Priority number, pickup location data, and drop-off location data for at least one of the one or more mobile computing devices; and
   wherein the rideshare vehicle is configured to:

receive, from the controller, the Rideshare Service Priority number, pickup location data, and drop-off location data for each of the one or more mobile computing devices;

select the Rideshare Service Priority number with a greatest value; and autonomously traverse to the location corresponding to the pickup location data for the selected Rideshare Service Priority number.

2. The system of claim 1, wherein:

the rideshare vehicle is further configured to transmit vehicle resource data to the controller; and the executable instructions additionally enable the controller to further base the Rideshare Service Priority number on the vehicle resource data.

3. The system of claim 1, wherein:

the rideshare vehicle is in a fleet of vehicles;

the executable instructions further enable the controller to:

calculate a number of rideshare vehicles in the fleet of vehicles;

calculate the number of mobile computing devices providing pickup location data and drop-off location data; and wherein the Rideshare Service Priority number is only calculated when the number of mobile computing devices is greater than the number of rideshare vehicles in the fleet of vehicles.

4. The system of claim 1, wherein the following weighted variables have the following default values:

$\alpha=1.0$;  $\beta1=0.167$;  $\beta2=0.167$;  $\gamma=0.20$;  $\delta1=0.167$;  $\delta2=0.0112$; and $\varepsilon=0.1$.

5. A rideshare method comprising:

providing a memory configured to comprise one or more executable instructions;

providing a controller configured to execute the executable instructions;

providing one or more mobile computing devices configured to transmit pickup location data and drop-off location data to the controller;

providing a rideshare vehicle configured to transmit vehicle location data to the controller, wherein the rideshare vehicle is an autonomous vehicle comprising a vehicle controls device configured to autonomously traverse from one location to another location;

receiving, at the controller, the pickup location data from the one or more mobile computing devices;

receiving, at the controller, the drop-off location data from the one or more mobile computing devices;

receiving, at the controller, vehicle location data from the rideshare vehicle;

based on the pickup location data, drop-off location data, and vehicle location data, calculating, via the controller, a Rideshare Service Priority number for each of the one or more mobile computing devices, wherein the Rideshare Service Priority number is calculated via the following equation:

$$V_T=\alpha(R_T)-\beta1(P_T)-\beta2(J_T)-\gamma(C_T)+\delta1(W_T)+\delta2(W_T^2)+\varepsilon(D_T)$$

wherein $V_T$ is the Rideshare Service Priority number, $R_T$ is an Expected Revenue Earned from Serving Client, $P_T$ is a Pickup Time to Serve Client, $J_T$ is a Journey Time to Serve Client, $C_T$ is a Charge Expended to Serve Client, $W_T$ is a Current Wait Time for Client, $D_T$ is a Desirability of Client Destination, and wherein each of $\alpha$, $\beta1$, $\beta2$, $\gamma$, $\delta1$, $\delta2$, and $\varepsilon$ is a weighted variable with a numerical default value;

transmitting, via the controller, to the rideshare vehicle, the Rideshare Service Priority number, pickup location data, and drop-off location data for at least one of the one or more mobile computing devices; and wherein the rideshare vehicle carries out the following steps:

receiving, from the controller, the Rideshare Service Priority number, pickup location data, and drop-off location data for each of the one or more mobile computing devices;

selecting, at the vehicle, the Rideshare Service Priority number with a greatest value; and autonomously traversing, via the vehicle controls device, to the location corresponding to the pickup location data for the selected Rideshare Service Priority number.

6. The method of claim 5, wherein:

the rideshare vehicle is further configured to transmit vehicle resource data to the controller; and the Rideshare Service Priority number is further based on the vehicle resource data.

7. The method of claim 5, further comprising:

wherein the rideshare vehicle is in a fleet of vehicles;

calculating, at the controller, a number of rideshare vehicles in the fleet of vehicles;

calculating, at the controller, the number of mobile computing devices providing pickup location data and drop-off location data; and wherein the Rideshare Service Priority number is only calculated when the number of mobile computing devices is greater than the number of rideshare vehicles in the fleet of vehicles.

8. The method of claim 5, wherein the following weighted variables have the following default values:

$\alpha=1.0$;  $\beta1=0.167$;  $\beta2=0.167$;  $\gamma=0.20$;  $\delta1=0.167$;  $\delta2=0.0112$; and $\varepsilon=0.1$.

9. A non-transitory and machine-readable medium having stored thereon executable instructions adapted to calculate a Rideshare Service Priority number, which when provided to a controller and executed thereby, causes the controller to:

receive pickup location data from one or more mobile computing devices;

receive drop-off location data from the one or more mobile computing devices;

receive vehicle location data from a rideshare vehicle, wherein the rideshare vehicle is an autonomous vehicle configured to autonomously traverse from one location to another location;

based on the pickup location data, drop-off location data, and vehicle location data, calculate Rideshare Service Priority number for each of the one or more mobile computing devices, wherein the Rideshare Service Priority number is calculated via the following equation:

$$V_T=\alpha(R_T)-\beta1(P_T)-\beta2(J_T)-\gamma(C_T)+\delta1(W_T)+\delta2(W_T^2)+\varepsilon(D_T)$$

wherein $V_T$ is the Rideshare Service Priority number, $R_T$ is an Expected Revenue Earned from Serving Client, $P_T$ is a Pickup Time to Serve Client, $J_T$ is a Journey Time to Serve Client, $C_T$ is a Charge Expended to Serve Client, $W_T$ is a Current Wait Time for Client, Dr is a Desirability of Client Destination, wherein each of $\alpha$, $\beta1$, $\beta2$, $\gamma$, $\delta1$, $\delta2$, and $\varepsilon$ is a weighted variable with a numerical default value, and wherein the weighted variables comprise the following default values:

$\alpha=1.0$; $\beta1=0.167$; $\beta2=0.167$; $\gamma=0.20$; $\delta1=0.167$; $\delta2=0.0112$; and $\epsilon=01$;

transmit, to the rideshare vehicle, the Rideshare Service Priority number, pickup location data, and drop-off location data for at least one of the one or more mobile computing devices; and wherein the rideshare vehicle, responsive to the Rideshare Service Priority number, pickup location data, and drop-off location data for at least one or more of the mobile computing devices, selects the Rideshare Service Priority number with a greatest value and autonomously traverses to the location corresponding to the pickup location data for the Rideshare service priority number.

10. The non-transitory and machine-readable memory of claim 9, further comprising:

receive vehicle resource data from the vehicle; and further base the Rideshare Service Priority number on the vehicle resource data.

11. The non-transitory and machine-readable memory of claim 9, further comprising:

wherein the rideshare vehicle is in a fleet of vehicles;

calculate a number of rideshare vehicles in the fleet of vehicles;

calculate the number of mobile computing devices providing pickup location data and drop-off location data; and wherein the Rideshare Service Priority number is only calculated when the number of mobile computing devices is greater than the number of rideshare vehicles in the fleet of vehicles.

* * * * *